Oct. 22, 1935.  C. G. STRANDLUND  2,017,872

PLOW

Filed March 12, 1934  7 Sheets-Sheet 1

INVENTOR
Carl G. Strandlund
BY Brown, Jackson, Boettcher & Dienner
ATTORNEYS.

Oct. 22, 1935.  C. G. STRANDLUND  2,017,872
PLOW
Filed March 12, 1934   7 Sheets-Sheet 2

INVENTOR
Carl G. Strandlund
BY Brown, Jackson, Boettcher & Dienner
ATTORNEYS.

Oct. 22, 1935. C. G. STRANDLUND 2,017,872
PLOW
Filed March 12, 1934 7 Sheets-Sheet 3
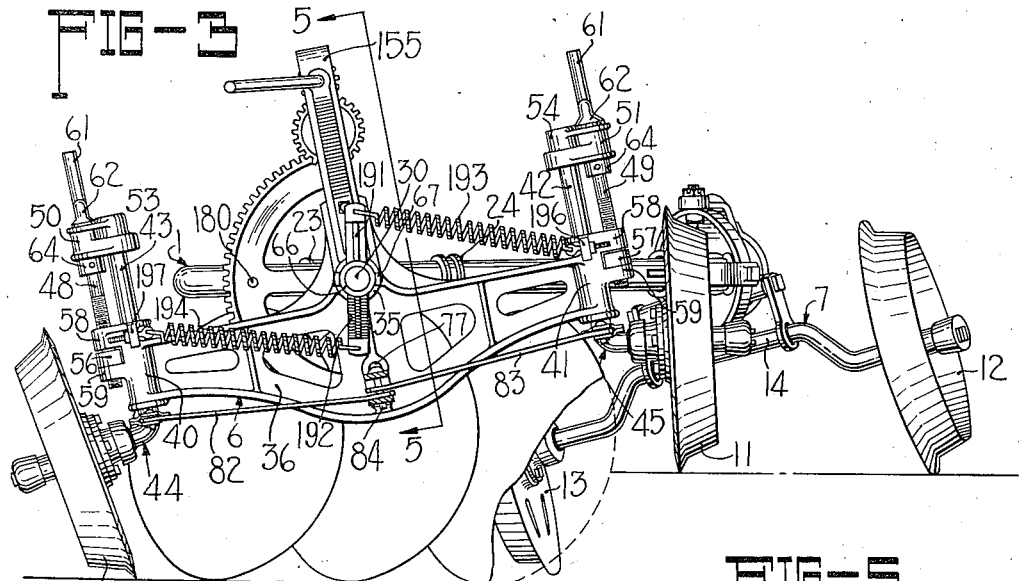
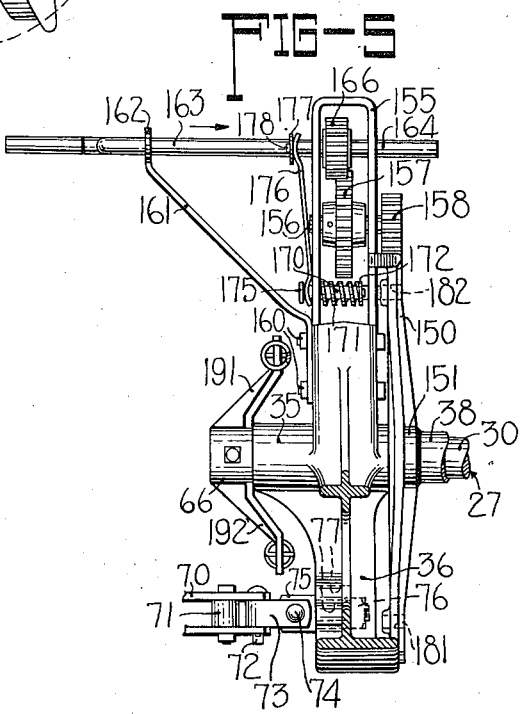
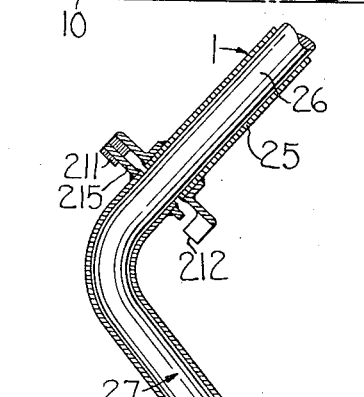
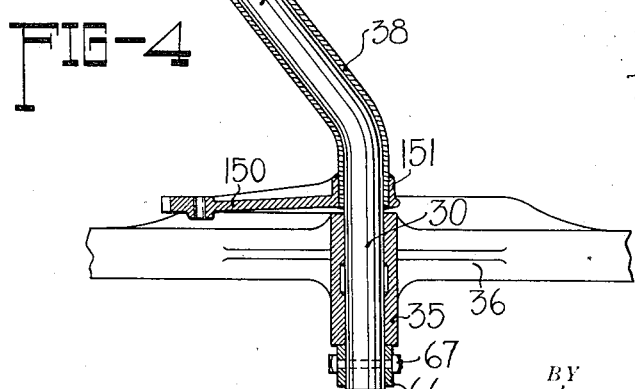
INVENTOR
Carl G. Strandlund
BY Brown, Jackson, Boettcher & Dienner
ATTORNEYS.

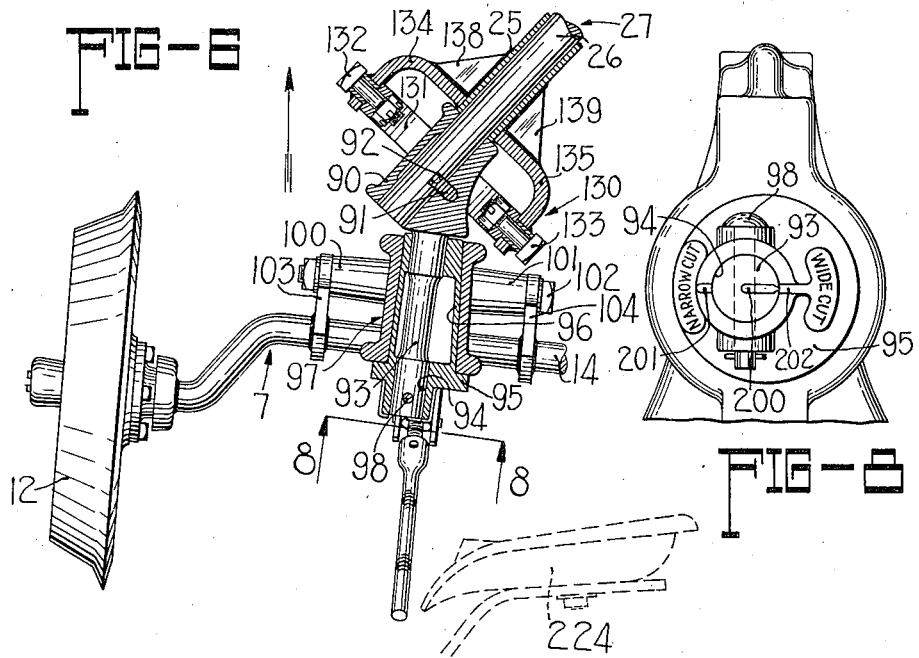

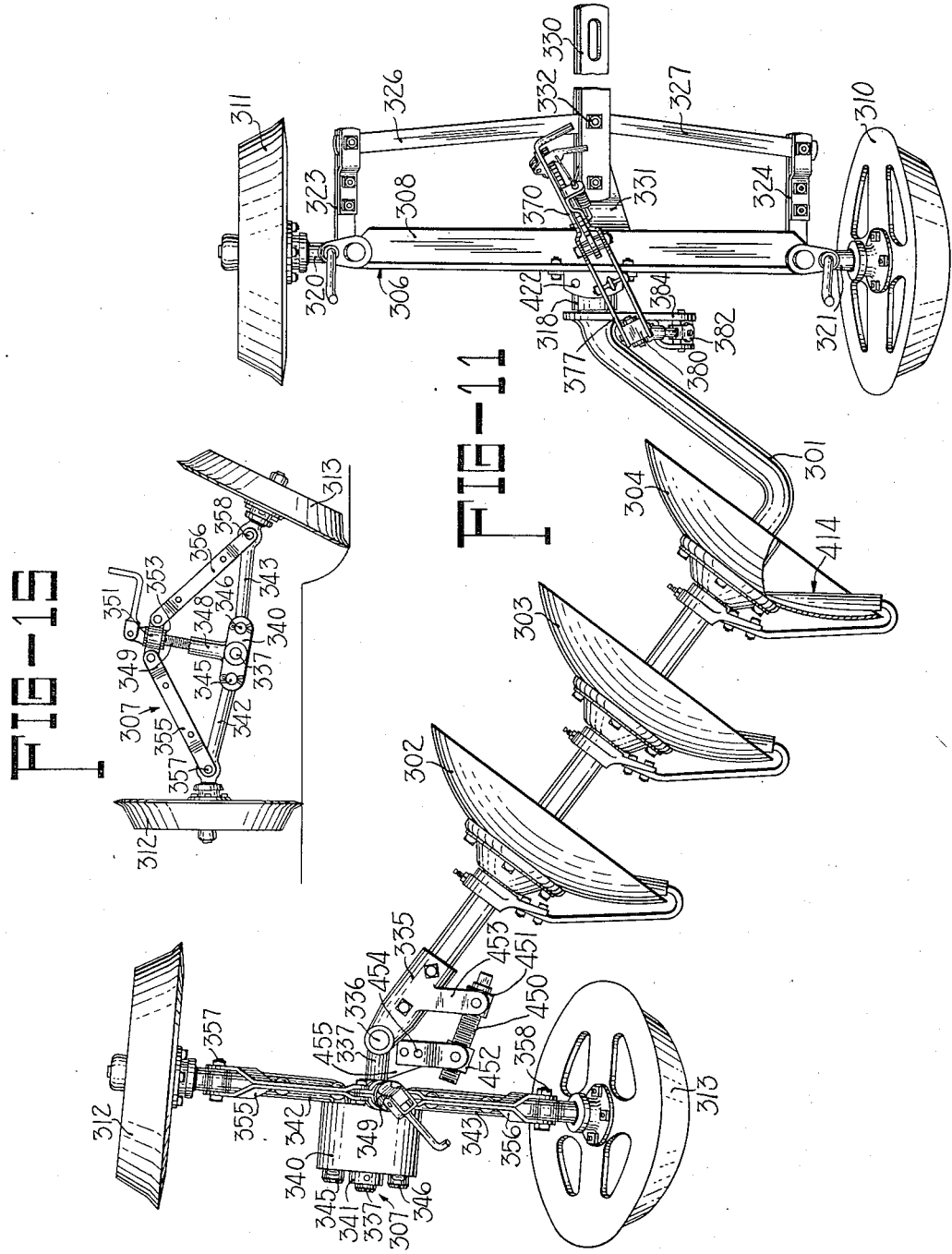

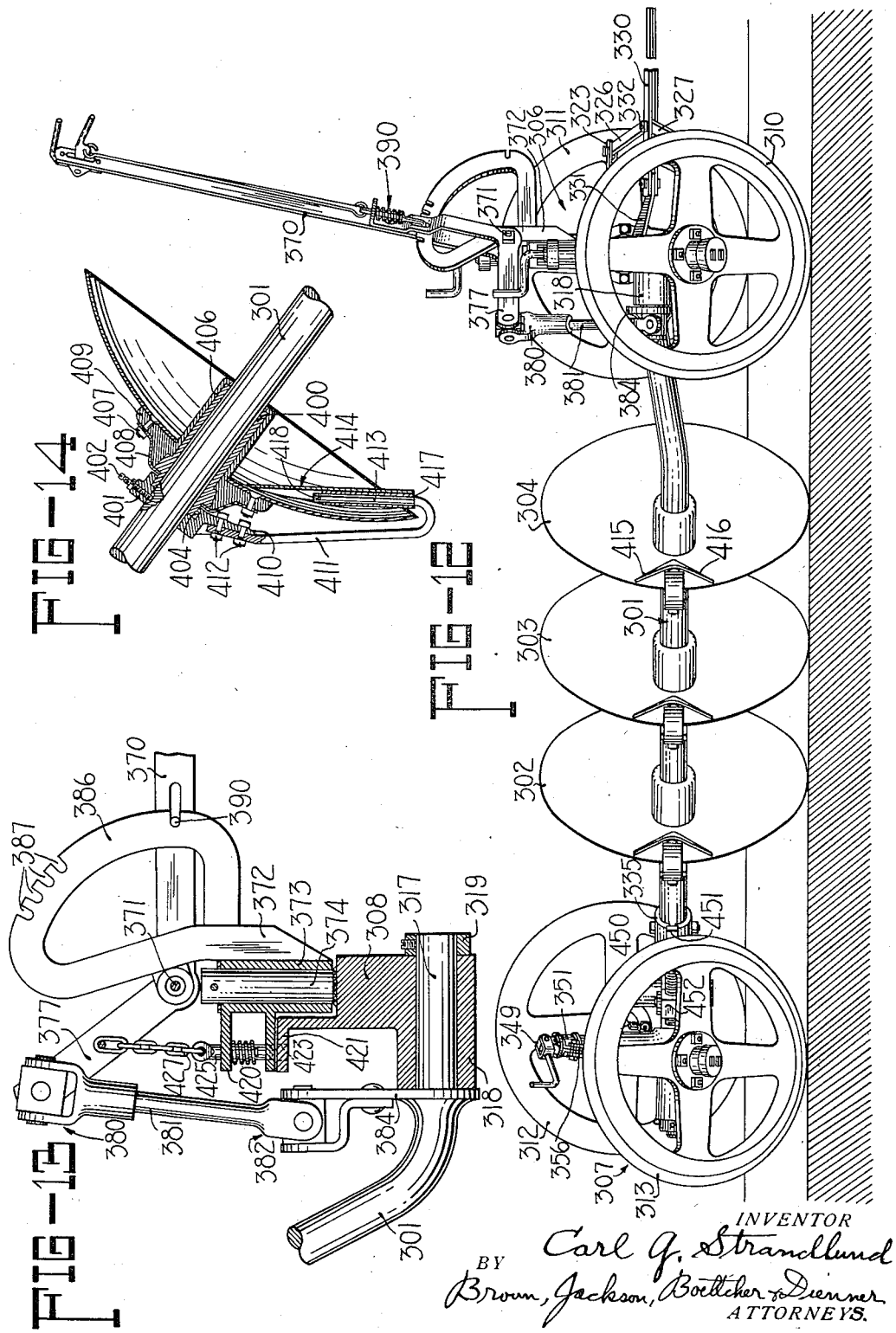

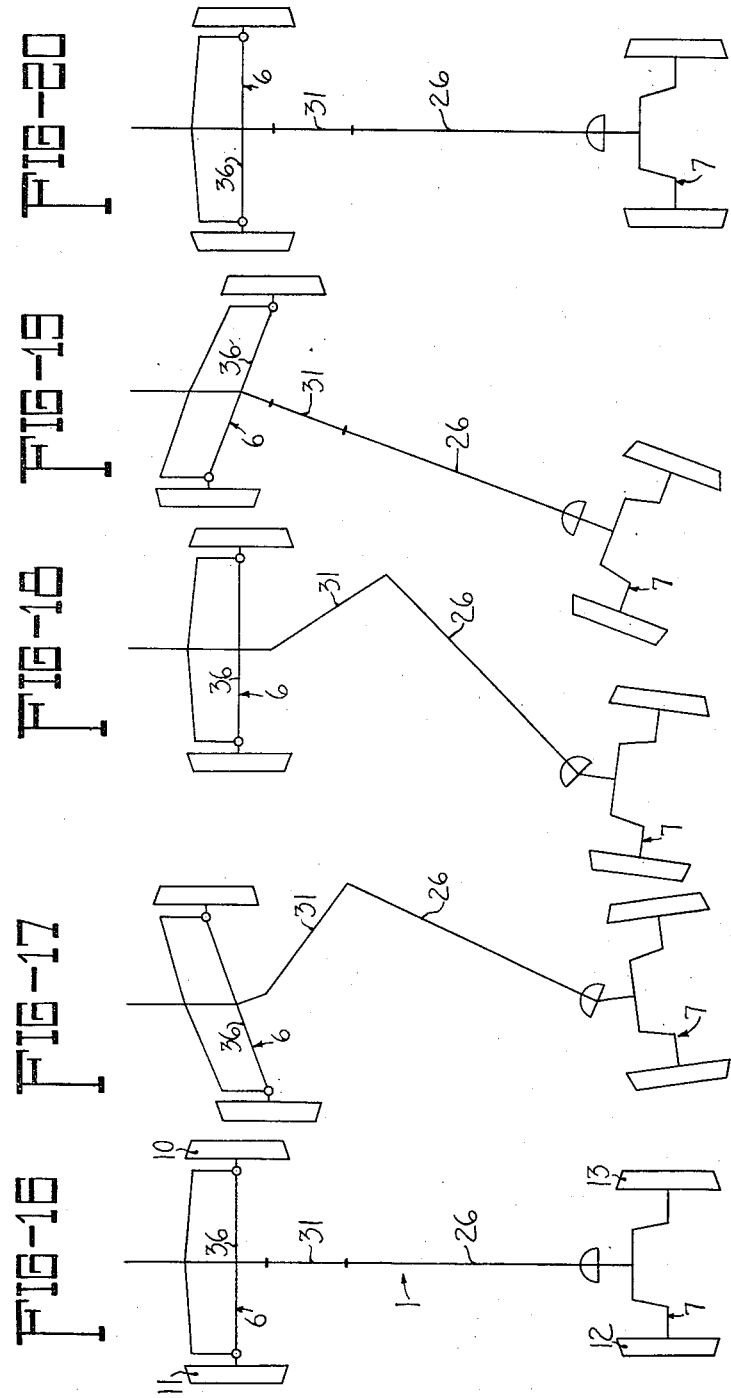

Patented Oct. 22, 1935

2,017,872

UNITED STATES PATENT OFFICE 2,017,872

PLOW

Carl G. Strandlund, Moline, Ill., assignor to Deere & Company, Moline, Ill., a corporation of Illinois Application March 12, 1934, Serial No. 715,085

22 Claims. (Cl. 97—26)

The present invention relates generally to plows and similar agricultural implements and has for its principal purpose the provision of a plow having a simplified and sturdy frame construction. More particularly the present invention is principally concerned with the provision of a reversible plow, that is, one in which the furrow opening means can be arranged to open a right hand furrow or a left hand furrow. Preferably, the plow is reversed by reversing the frame, or a portion thereof on which the furrow opening means is mounted, by swinging the same vertically about a generally longitudinal axis.

Another object of the present invention is to provide a disk plow having the above mentioned features, and it is specifically an object of the present invention to provide a reversible disk plow in which the disks are mounted upon a frame consisting of a generally longitudinally disposed frame bar which is capable of being rotated at least approximately a half revolution about a longitudinal axis. Another object of the present invention is to provide such a frame so constructed and arranged that the portion thereof upon which the disks are mounted is disposed diagonally with respect to the general longitudinal axis of the frame, and as a result of this arrangement the disks are positioned in the proper laterally offset relation with respect to each other, both in the one direction when the frame is in one position and in the opposite direction when the frame is in its other position.

Still further, another object of the present invention is the provision of a plow having such a reversible frame that, when the plow is reversed from one operating or working position to the other, the rear supporting means, which is preferably a wheeled truck, is given the proper lead with respect to the line of advance by the operation of reversing the frame and without any attention on the part of the operator, thus making this feature of the implement automatic.

An additional object of the present invention is the provision of a plow having a plurality of furrow openers mounted upon the diagonal portion of a generally longitudinal frame bar which is reversible and which is so formed and constructed that in either position of the frame bar the line of draft is brought to the proper position relative to the implement and, in addition, both the front and rear supporting means for the plow frame are also brought to the proper position entirely automatically and without any attention on the part of the operator other than the operation of reversing the frame in the first place.

These and other objects of the present invention will be apparent to those skilled in the art after a consideration of the following detailed description of structure embodying the principles of the present invention, taken in conjunction with the accompanying drawings illustrating such construction.

In the drawings:

Figure 3 is a front view of the implement shown in Figure 1, looking rearwardly;

Figure 4 is an enlarged fragmentary horizontal section of the front portion of the diagonal supporting frame bar;

Figure 5 is a view, on a somewhat enlarged scale, taken along the line 5—5 of Figure 3;

Figure 6 is a horizontal section taken through the rear end of the implement frame and showing in particular the manner in which the angularly disposed spindle portion or rear end of the diagonal frame bar is journaled in the rear supporting truck;

Figure 7 is a view taken along the line 7—7 of Figure 1 and looking in the direction of the arrow;

Figure 8 is an enlarged view taken along the line 8—8 of Figure 6;

Figures 9 and 10 are enlarged detail views showing the stop means for holding the furrow openers in proper working position, Figure 10 being a section taken along the line 10—10 of Figure 1;

Figure 11 is a top plan view of an implement embodying the principles of the present invention in a somewhat simplified modified form;

Figure 12 is a side view of the implement shown in Figure 11;

Figure 13 is an enlarged fragmentary side view of a portion of the front end of the machine, showing the disk supporting bar raising means in a position corresponding to the raised position of the bar;

Figure 14 is a horizontal section taken through one of the furrow opening disks and showing the mounting of the disks on the supporting bar and the construction of the disk scraper;

Figure 15 is a view of the rear end of the machine shown in Figure 11, taken on a reduced scale; and Figures 16 to 20, inclusive, illustrate the action of implements constructed according to the principles of the present invention, Figure 16 illustrating the relation of the parts as the machine is being transported, Figures 17 and 18 illustrating the position of the parts when the machine is lowered to working position, and Figures 19 and 20 illustrate the action of the machine when it is raised from working to non-working position.

Figure 1:
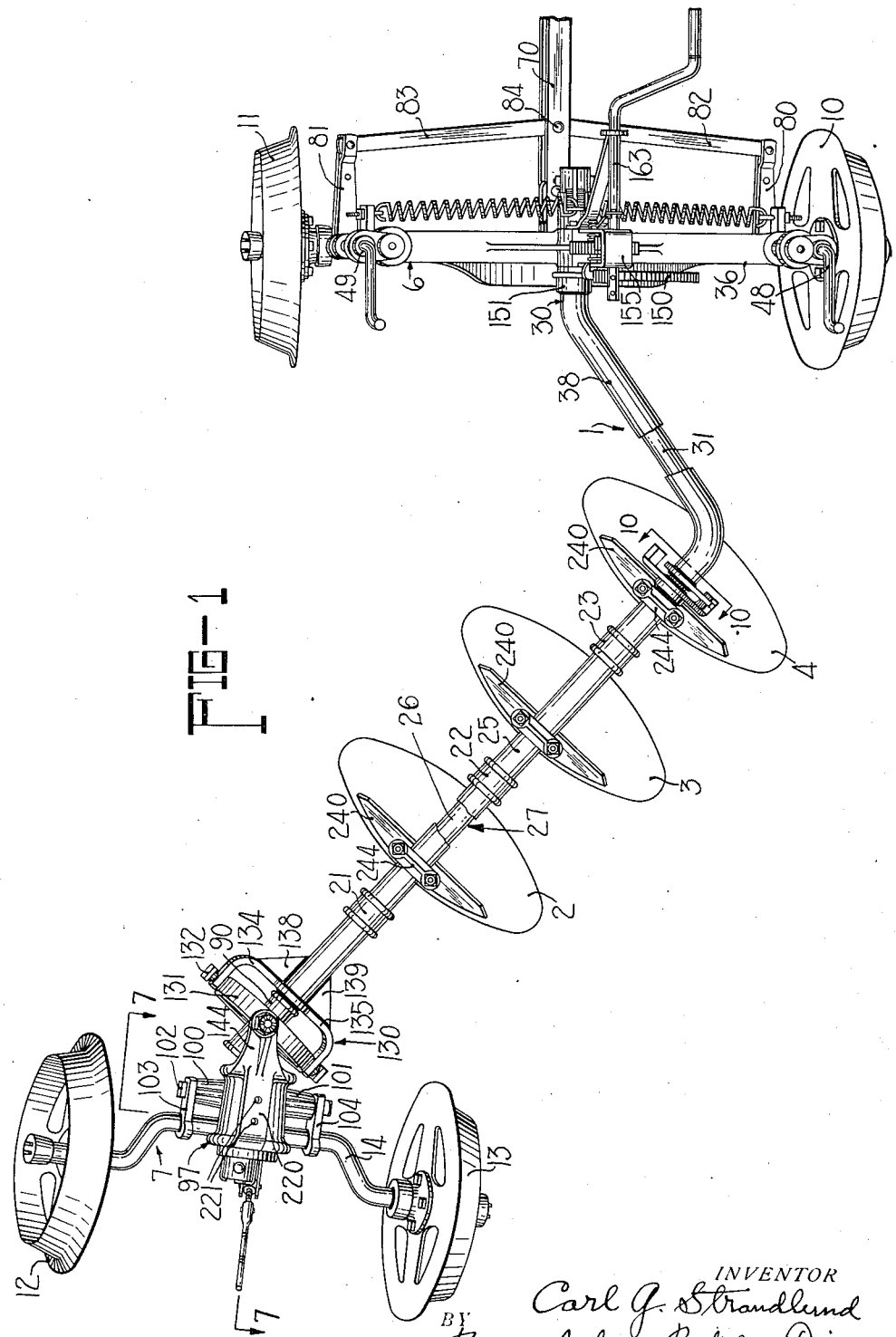
Figure 1 is a top plan view of a reversible disk plow of the preferred form and embodying the principles of the present invention, illustrating the furrow opening means in working position and arranged to throw furrows to the right.
Figure 2:
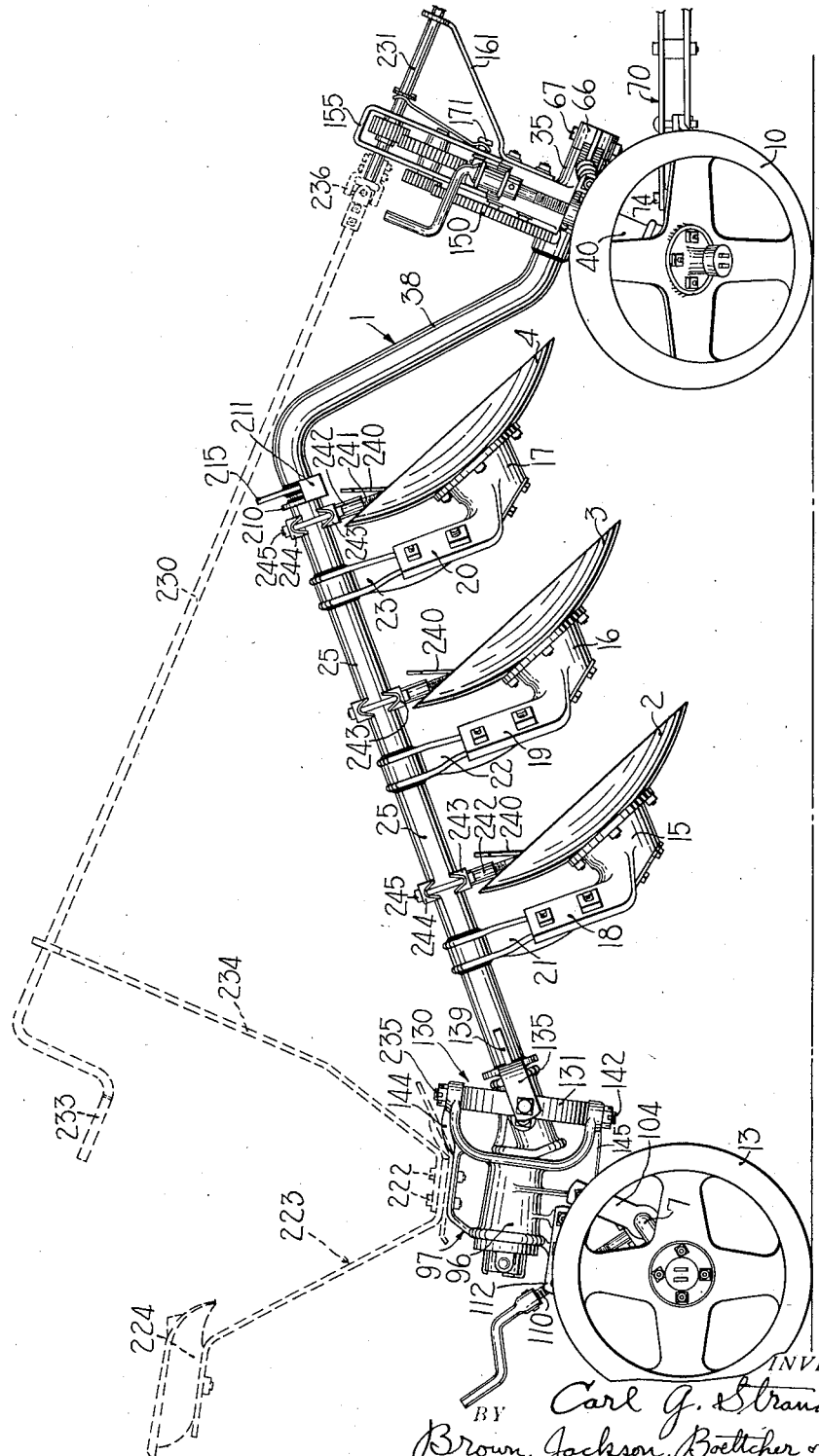
Figure 2 is a side view of the implement shown in Figure 1 but with the tools raised to non-working or transport position.

Referring now more particularly to Figures 1 and 2, the preferred form of plow in which the principles of the present invention have been embodied comprises a generally longitudinally disposed frame structure indicated in its entirety by the reference numeral 1 and supporting three disks 2, 3 and 4, although it is to be understood that the number and form of furrow openers may be varied as desired. The plow frame 1 is provided with front and rear supporting means, preferably in the form of a front truck 6 and a rear truck 7, and the front truck is provided with dirigible wheels 10 and 11 while the rear truck 7 is provided with rear wheels 12 and 13 journaled on the laterally outer ends of a crank axle 14. If desired, however, the front end may be mounted directly on a tractor.

As is usual in this type of implement, the furrow openers 2, 3 and 4 are journaled in bearings 15, 16 and 17 preferably, although not necessarily, formed integral with standards 18, 19 and 20. The mounting of the disks in their bearings forms no part per se of the present invention. The standards 18, 19 and 20 are fixed, as by bolts, to the lower ends of depending arms 21, 22 and 23, respectively, fixed as by welding to a sleeve member 25 which is journaled on a diagonally disposed portion 26 (see Figure 1) of a generally longitudinally disposed frame bar 27 which forms the principal part of the frame 1.

As best shown in Figures 1 and 4, the disk supporting frame bar 27 is bent angularly to form a front spindle section 30 and a laterally bent section 31 which terminates rearwardly in the diagonally disposed section 26 referred to above and on which the disk supporting sleeve 25 is journaled. The front spindle section 30 is journaled in a sleeve or bearing 35 which may be supported on the tractor, but where the front truck 6 is employed the bearing 35 is preferably formed as an integral part of a front axle casting 36 constituting the principal part of the front truck 6. For reenforcing purposes, the intermediate or laterally bent section 31 of the frame bar 27 is enclosed in a pipe 38, the pipe and the forward end of the bar 27 being bent at the same time and thereby forming a rigid section of the frame unit 1.

The laterally outer ends of the front axle 36 are formed with vertically disposed spindle sleeves 40 and 41, and these sleeves receive the vertical sections 42 and 43 of spindles 44 and 45, and the front dirigible wheels 10 and 11 are mounted on the laterally bent ends of the spindles 42 and 43, as best shown in Figure 3. The front axle 36 is supported on the spindles 44 and 45 by means of adjusting crank screws 48 and 49 which are journaled in bearings 50 and 51 formed integral with spindle caps 53 and 54 supported on the upper ends of the vertical spindle sections 42 and 43. The lower ends of the crank screws 48 and 49 are threaded into nuts 56 and 57 which are non-rotatably disposed between vertically spaced lugs 58 and 59 formed on each of the spindle sleeves 40 and 41, preferably adjacent the upper portions thereof. Each of the adjusting cranks 48 and 49 have handle portions 61 terminating in shouldered sections 62 which bear against the upper ends of the bearings 50 and 51, and each adjusting crank also carries a collar 64 or the equivalent at the lower end of the bearings 50 and 51. The vertical position of the front wheels 10 and 11 with respect to the front axle 36 is controlled through the manipulation of the crank screws 48 and 49, and by controlling the vertical position of the front wheels, the depth of operation of the plow can be controlled.

As best shown in Figures 4 and 5, the spindle section 30 at the forward end of the supporting frame bar 27 is held in position in the bearing sleeve 35 at the front by an arm 66 secured to the front end of the spindle section 30 by a bolt 67, and at the rear portion of the bearing sleeve 35 the spindle section 30 is held in position by the forward end of the reenforcing pipe member 38. The arm 66 also has another function which will be referred to later. The plow is propelled by means of a draft bar 70 which comprises two vertically spaced members between the rear ends of which a spacer 71 is mounted adjacent a vertical pivot pin 72, the latter being received by a strap 73 which is connected by means of a horizontal pivot 74 with a lug 75 bolted to the lower portion of the front axle 36. Preferably, the attaching lug 75 is formed with a bolt end or threaded section 76 which may be disposed in any one of a plurality of vertically spaced holes 77 formed in the front axle 36. One of the additional openings can be seen in Figure 3.

The front wheels 10 and 11 are dirigible wheels and pivot, respectively, about the axes of the spindle sections 42 and 43, as mentioned above. The plow is guided by suitable steering connections between the draft bar 70 and the front wheels 10 and 11. These steering connections include forwardly extending arms 80 and 81 welded to the lower portions of the spindles 44 and 45. The forward ends of the arms 80 and 81 are connected, as best shown in Figure 1, by means of links 82 and 83 to the draft bar 70, the inner ends of the links being pivotally connected to the draft bar 70 by means of a pin 84. Thus, whenever the draft tongue 70 is turned laterally with respect to the front axle 36, the wheels 10 and 11 are steered in substantial parallelism with respect to the tongue 70.

Figure 6 shows the mounting for the rear end of the plow frame 1. The diagonal section 26 of the disk supporting bar 27 is anchored in a casting 90 by means of a wedge pin 91 which extends through holes in the casting 90 and engages in a notch 92 in the rear end of the bar section 26. A shank portion 93 is formed integral with the casting 90 and is disposed in a boring 94 formed in a sleeve member 95 which, in turn, is journaled in a bearing 96 formed integral with the rear supporting casting 97, which forms a part of the rear truck 7. Normally, the sleeve 95 and the shank 93 are connected together by means of a pin 98 which prevents these parts from rotating relative to one another but which provides for the rotation of the sleeve in the bearing 96.

The rear casting 97 is provided with laterally extending sleeve sections 100 and 101 which are cored to receive a pivot bolt 102 which at its ends carries downwardly and rearwardly disposed arms 103 and 104 which are welded at their lower ends to the crank axle 14 on which the rear wheels 12 and 13 are journaled. The position of the crank axle 14 relative to the supporting casting 97 is controlled by means of a crank screw 110 which is threaded into a nut 111, the latter being supported by trunnions pivoted in the rear ends of bracket 112 and 113 fixed to the supporting casting 97 by means of bolts 115. The lower end of the crank screw 110 has a swivel connection with the crank axle 14 established by the provision of a pair of blocks 120 and 121 embracing the midportion of the crank axle 14 and bolted together by means of bolts 122. The upper block 120 is provided with a socket for receiving an enlarged portion 124 formed on the lower end of the crank screw 110. Turning the latter in one direction or the other swings the crank axle 14, and hence the rear wheels 12 and 13 journaled thereon, upwardly or downwardly about the transverse axis defined by the pivot bolt 102.

The sleeve 25, upon which the disk supporting arms 21, 22 and 23 are fixedly supported and which is journaled for rocking movement on the diagonal section 26 of the supporting bar 27, is held so as to dispose the arms 21, 22 and 23 in a vertical plane in all positions of the disk supporting frame bar by means of a universal connection with the rear supporting casting 97 which forms a part of the rear truck 7. The universal connection is indicated in its entirety by the reference numeral 130 and comprises a ring 131 pivotally supported on the rear end of the supporting pipe member 25 by means of pivot bolts 132 and 133 carried at the ends of diametrically disposed arms 134 and 135 securely fixed, as by welding, to the rear end of the pipe member or sleeve 25. Preferably, the arms 134 and 135 are arranged to be disposed substantially horizontally although this particular arrangement is not necessarily essential. If desired, the arms 134 and 135 may be reenforced by webs 138 and 139 fixed to the rear end of the sleeve 25 and the arms in the manner best shown in Figure 6. The ring member 131 is also pivotally connected, as by pivot bolts 141 and 142, to upper and lower forwardly extending arms 144 and 145 which are preferably although not necessarily formed integral with the rear casting 97.

By virtue of this construction, whenever the supporting bar structure 1 of the plow is rocked about the generally longitudinal axes defined by the spindle portions 30 and 93, the sleeve member 25 is constrained to hold the disk standards 18, 19 and 20 substantially in a vertical position at all times by virtue of the universal connection 130 just described.

The mechanism by which the frame bar 1 is swung from one side to the other, or to transport position, which is the position shown in Figure 2, may be arranged to be operated from either the front or the rear of the implement. For example, should the implement be designed as a tractor pulled machine or should the front end construction of the machine be designed to be carried by the tractor, it would be desirable to have the control for swinging the frame bar actuated from the front of the plow, and such is the construction illustrated in Figure 1. As shown, the reversing mechanism comprises a large gear sector 150 having a hub 151 secured as by welding to the forward end of the reenforcing pipe member 38, as best shown in Figure 4. The gear sector 150 moves in a path closely adjacent to the plane of the front axle 36, and the latter carries a vertically disposed U-shaped bracket 155 in which a shaft 156 is disposed and which carries a gear 157 and a pinion 158, the latter meshing with the gear sector 150. Bolts 160 or the equivalent are utilized in mounting the bracket 155 on the front axle, and these same bolts may be used to mount a bracket 161 having an apertured upper end 162 adapted to receive a crank 163, the rear end 164 of which is slidably and rotatably mounted in suitable bearing openings formed in the upper portion of the U-shaped bracket 155. The end 164 of the crank carries a pinion 166 suitably fixed thereto and in engagement with the gear 157, whereby rotation of the crank, under the control of locking means which will be described presently, will cause the gear sector to be swung through substantially 180°, carrying with it the supporting frame bar 1 and the furrow openers 2, 3, and 4 carried thereon.

The gear sector 150 may be locked in either of its right and left hand positions or in raised or transport position by locking means which will now be described. As best shown in Figure 5, a locking plunger 170 is disposed in suitable openings provided in the lower end of the U-shaped bracket 155, and the plunger is surrounded by a biasing spring 171 which abuts against one of the arms of the U-shaped bracket 155 and suitable stop means, such as a washer 172 held in place on the plunger 170 by a cotter key or the equivalent. The forward end of the plunger 170 is provided with a head 175 against which is disposed one end of a lever 176, the latter being fulcrumed on the forward end of the shaft 156 and having its upper end disposed against a washer 177 held in position on the crank 163 by any suitable means, such as a cotter pin 178.

The plunger 170 is biased by the spring 171 for movement toward the gear sector 150, and the forward end of the plunger 170 is adapted to engage in any one of three holes 180 (Figure 3), 181 and 183 (Figure 5). When the plunger 170 is disposed in the intermediate opening 180, the frame bar is held in its transport position, the position shown in Figure 2, and when the plunger 170 is engaged in either of the other openings, the frame bar is maintained in either its right hand or left hand position.

The plunger 170 is moved to an unlocked position by a longitudinal movement of the crank 163 in the direction of the arrow in Figure 5. Moving the plunger in this direction will swing the lever 176 in a clockwise direction as viewed in Figure 5 and will withdraw the plunger 170 from the opening in the gear sector 150 in which it is normally disposed, and then after the plunger 170 has thus been disengaged from the gear sector 150, the crank 163 may be rotated to swing the gear sector and the frame bar 1 to the desired position. After the gear sector 150 has been rotated past a locked position, as represented by the openings 180, 181 and 182, the rearward pressure applied to the crank 163 may be relieved, and when the gear sector reaches the next locked position to which it is rotated, the plunger 170 will be automatically engaged in the opening as soon as one of the openings comes opposite the plunger 170. For example, when the plow is in one of its operating positions, say the position shown in Figure 1, by pushing rearwardly on the crank 163 to release the plunger holding the gear sector in locked position, and by then rotating the crank, the gear sector 150 will be caused to revolve and raise the furrow openers to transport position, and as soon as the transport position is reached, the plunger will automatically engage in the opening 180 and will lock the plow in its raised position.

In the raising and lowering operations, the operator actuating the crank 163 is aided by the provision of spring means associated with the forward end of the furrow opener supporting bar. For this purpose, the member 66 is formed with diametrically arranged arm sections 191 and 192, and springs 193 and 194 are connected, respectively, to the outer ends of these arm sections. The outer ends of the springs 193 and 194 are anchored to lugs 196 and 197 extending forwardly from the sleeve portions 40 and 41.

In most plows of the type described above, it is desirable to dispose the rear truck 7 at a given angular position relative to the longitudinal frame bar 1, so as to maintain the furrow openers in the proper position relative to their work. For example, when the furrow openers are disks, the rear truck is so angled with respect to the line of advance as to give the wheels 12 and 13 a lead in a direction away from the land. This is necessary in disk plows to prevent the disks from cutting too wide a furrow. In the present construction, by shifting the angular relations between the rearwardly extending spindle shank 93 and the rear truck 7, the proper lead for the rear truck may be provided, and since the shank 93 is disposed in eccentric relation with respect to the sleeve 95, by adjusting the position of the sleeve relative to the shank, the angularity of the rear truck may be varied as desired, not only to adjust the plow for various kinds or numbers of furrow openers, but also to vary the width of cut. For example, in the disk plow shown, the total width cut by the three disks 2, 3, and 4 may be controlled by varying this angle of lead.

In the construction illustrated in Figures 1, 6 and 7, the rear wheels 12 and 13 may be set in either of two positions. By arranging the shank 93 and sleeve 95 in the relations shown in Figures 6 and 8, the wheels are given a lead of about 5° with respect to the direction of advance, and by turning the sleeve 95 180° relative to the shank 93, the wheels 12 and 13 will be given a lead of about 10°, the width of cut being lessened appreciably when the wheels are in the second position. While the rear wheels 12 and 13 are shown as having the same angle of lead, the two wheels could, if desired, be set so that one wheel has more lead than the other. As best shown in Figure 8, a pointer 200 is cast on the end of the shank portion 93, and lugs 201 and 202 are cast on the end of the sleeve 95 on opposite sides of the bearing receiving the shank or spindle 93. One of the lugs is preferably labeled "Narrow cut" while the other is labeled "Wide cut". When the sleeve 95 is disposed in the position in which the pointer 200 is opposite the lug 201, a relatively narrow cut is made, and when the sleeve 95 is positioned with the lug 202 opposite the pointer 200, a relatively wide cut is made. To rotate the sleeve 95 from one position to the other, the pin 98 must, of course, be removed. In order to secure intermediate positions more than one hole for the bolt 98 may be provided if desired, and such other holes would be formed either in the shank 93 or the sleeve 95 at an angle to the holes illustrated in Figure 6.

It will be remembered that when the plow is in working or operating position the frame bar 1 is disposed with the section 29 thereof in diagonally arranged position with the standards 2, 3, and 4 of the furrow openers extending downwardly, and if the plow is reversible, the standards will lie in the vertical plane containing the diagonal portion of the frame bar 1. Due to the fact that the center of pressure against the furrow openers 2, 3, and 4 is disposed inside of the vertical plane of the sleeve member 14 and below the axis of rocking movement of the member 14, there will be a tendency for the sleeve to rotate upon the diagonal section of the frame bar upon which it is mounted. Such a tendency is resisted, however, by the rear truck 7, the rotative stresses being transmitted thereto through the universal connection 130. The effect of these stresses on the rear truck 7 is to cause the rear wheel 12 to bear downwardly while the right hand rear wheel 13 tends to be lifted if the pressure is sufficiently great. To better offset this tendency of the sleeve 25 to rotate and transmit all of the ground pressure to the left hand rear wheel 12, relieving all of the pressure from the right hand wheel 13 and possibly lifting the wheel off the ground, the present invention contemplates the provision of suitable stop means between the forward end of the sleeve 25 and the frame 1 so that the front truck 6 can be utilized in meeting these stresses. Such stop means comprises an arm 210 fixed to the forward end of the sleeve member 25 on which the disks 2, 3 and 4 are mounted. The arm 210 includes portions extending laterally in opposite directions and provided with stop lugs 211 and 212 which are adapted to be engaged by an arm 215 fixed to the rear end of the reenforcing pipe member 30 which, it will be remembered, is mounted on the forward section 31 of the disk supporting frame bar, as best shown in Figure 4. When in one position, for example the position shown in Figure 1 in which the furrow openers throw right hand furrows, the arm 215 engages the stop lug 211, and when the disk supporting bar is swung to the other side so as to throw left hand furrows, the arm 215 engages the other stop lug 212. By virtue of this construction it will be seen that the pressure of the soil against the disks and the resultant tendency to rotate the sleeve member 25 are resisted by both the front and rear supporting means, that is, the front and rear trucks 6 and 7 in the illustrated construction.

The implement described above may be arranged to be drawn by draft animals, or by a farm tractor, the force of draft being connected with the draft tongue 70. Where draft animals are employed an operator's seat and suitable control connections for such an arrangement may be provided and are mounted as indicated in dotted lines in Figure 2. The rear supporting casting 97 is preferably provided with a flat upper surface 220 having two spaced holes 221 for receiving bolts 222 (see Figures 2 and 7) by which the supporting bar 223 of a seat 224 is mounted. To accommodate this arrangement a crank shaft 230 is connected to the rear end of a shaft 231, which is journaled in the supports 155 and 161 and takes the place of the adjusting crank 163 referred to above, for swinging the supporting bar from one position to another. The rear end of the crank shaft 230 terminates in an operating handle 233 and is supported by means of a bracket 234 connected with the rear casting 97 by the bolts 222. It is not necessary, of course, that the bracket 234 be fixed by the same bolts by which the operator's seat is secured in place. However, this construction is preferred, and likewise the bolts 222 are utilized to mount a foot board 235 in place on the casting 297 for the convenience of the operator. Preferably, the front end of the adjusting crank 230 is connected with the rear end of the pinion shaft 231 by means of a universal joint 236. The crank shaft 230 is shifted longitudinally to disengage the plunger 171 from the gear sector 150 in the same manner described above in connection with the shaft crank 163. The latter is used generally when a tractor is employed for pulling the plow, in which case it is desired that the frame control be available to an operator stationed on the tractor.

Each of the disks 2, 3, and 4 is provided with a scraper 240 which is supported on a threaded standard 241 which is received within a threaded sleeve 242 forming a part of a clamp 243 secured on the member 25 by a companion clamp member 244. The two clamp parts are fixed around the sleeve 25 by bolts 245 or the equivalent. Each of the scrapers is symmetrical about a vertical center line to function in either operating position of the plow, and the center line of the scraper clamps intersects the axis of the sleeve member 25 and the axis of rotation of the associated disk. In one operating position the disks rotate in one direction, and when the plow is in its alternative operating position the disks rotate in the opposite direction.

When rotating in one direction, soil is carried up on the furrowward side of the disks and against one side of the scraper. Pressure of the soil against this side of the scraper causes the latter to bear against the adjacent portion of the disk, but when the disk is disposed in its alternative operating position and when it rotates in the opposite direction, the opposite side of the scraper bears against the disk. The threaded mounting of the scraper in the threaded section 242 permits the scraper to rock a slight amount so as to bear on one side or the other of the associated disk.

In Figures 11 to 15 I have shown a somewhat simplified construction as compared with the form of the invention shown in Figures 1 to 10. Referring now more particularly to Figures 11 and 12, the plow shown in these two figures comprises a generally longitudinally disposed disk supporting frame bar 301 carrying three disks 302, 303 and 304 and supported at its front and rear ends upon front and rear trucks 306 and 307. The front truck 306 consists of a generally transverse front axle 308 supported on front dirigible wheels 310 and 311, and the rear truck 307 is supported upon rear wheels 312 and 313 by suitable adjustable linkage mechanism which will be described later. The forward end of the frame bar 301 is bent to about the same configuration as that shown for the frame 1 in Figures 1 and 2, and the forward end of the frame bar 301 serves as a spindle 317 and is journaled in a bearing 318 supported by the front axle 308. A collar 319 serves to hold the spindle section 317 in place in the front axle 308.

The front wheels 310 and 311 are dirigible wheels and are carried, respectively, on vertical spindles 320 and 321 identical, for all practical purposes, with the spindles for the wheels 10 and 11 shown in Figure 1. The spindles 320 and 321 in Figure 11 are provided with forwardly extending arms 323 and 324, and the forward ends of these arms are connected by means of links 326 and 327 with a draft tongue 330 which is pivotally connected at its rear end with a bracket 331 suitably fixed to the front axle 308. The links 326 and 327 are pivotally connected with the draft tongue 330 by means of a pivot bolt 332.

At the rear end of the plow, the rear end of the draft bar 301 is bolted in a socket member 335 which is pivoted by means of a vertical pivot pin 336 to a spindle section 337 suitably journaled in a bearing opening provided in a rear frame member 340, which is preferably in the form of a casting serving as a part of the rear truck 307. A collar 341 is pinned onto the rear end of the spindle section 337 and cooperates with the frame casting 340 to retain the spindle section 337 in the proper position in the central bearing opening therein. By virtue of the spindle sections and the members 319 and 340 in which they are journaled, the frame or supporting bar 301 may be swung about a generally horizontal axis from one position to another and to an intermediate or transport position, in a manner similar to that set forth above in connection with the plow illustrated in Figure 1. The means for shifting the frame bar 301 will be described later.

The rear truck 307 includes means providing for raising and lowering the rear end of the frame bar 301. The rear wheels 312 and 313 are journaled on the outer ends of axle sections 342 and 343, and the laterally inner ends of these axle sections have ends 345 and 346 (Figure 11) bent rearwardly and journaled in bearing openings provided in the rear frame member or casting 340, said bearing openings being parallel with respect to the bearing opening in which the spindle section 337 is disposed. The frame member 340 includes a vertically disposed threaded sleeve section 348 in which a crank screw 349 is disposed. The latter carries a short sleeve 351 near its upper end, and the sleeve 351 is preferably formed of separable sections bolted together and disposed between a pair of vertically spaced flanges carried on the upper end of the crank 349. A pair of links 355 and 356 are pivotally connected at their inner ends to the sleeve 351 and at their outer ends they are connected with the outer portions of the axle sections 342 and 343, as by pivot pins 357 and 358. The rear truck 307 is thus in the form of a trussed member, and the position of the spindle section 337 relative to the wheels may be varied by turning the crank screw 349, as will be clear from Figure 15.

The mechanism by which the frame bar 301 is swung from one side to the other, or to transport position, may be carried by either the front or rear truck, and the same is true of the modification shown in Figure 11, but preferably the front truck is utilized to support this mechanism. As best shown in Figure 13, the reversing mechanism comprises a lever 370 pivotally mounted, as by a pivot bolt 371, upon a bracket 372 welded to a sleeve 373 which is journaled upon a vertically disposed stud or pin 374 fixedly supported upon the front axle 308. The vertically disposed pin or stud 374 forms a support about which the bracket 372 and the lever 370 swings laterally, as will be referred to later.

The lever 370 includes a rearwardly disposed arm section 377, either secured thereto or formed as an integral part thereof, and to the rear end of this arm section a universal joint 380 is connected. The universal joint 380 is carried at the upper end of a link 381 the lower end of which is connected by a similar universal joint 382 to the outer end of an arm 384 securely fixed to the forward end of the longitudinal frame bar 301. The bracket 372 includes a sector 386 which is provided with four notches 387 at its upper portion and another notch 388 at the lower portion. The last named notch represents the raised position of the disks 302, 303 and 304, for when the lever 370 is swung downwardly so that the detent mechanism 390, carried thereby, engages the notch 388, the frame bar 301 has been swung from the horizontal position shown in Figure 11 up to a vertical position, as shown in Figure 13, the arm 384 thereof extending vertically. The upper notches 387 represent different operating positions, for when the frame bar 301 is allowed to swing downwardly, either to one side or the other, by raising the lever 370, and when the detent mechanism 390 is engaged in one or the other of the notches 387, the disks 302, 303 and 304 will be locked in one of several adjusted working positions. Also, when the frame bar 301 swings, say from one working position to the other, it will be seen that the outer end of the arm 384, the end to which the universal 382 is connected, swings from one side of the plow to the other, and in order to have the end of the arm 377 always directly above the outer end of the arm 384, the lever supporting bracket 372 is permitted to swing about the vertical axis defined by the pivot pin or stud 374.

Although in the form of the invention shown in Figures 11 and 12, the disks 302, 303 and 304 are not mounted on standards depending from the supporting bar, it will be observed that nevertheless the axes of the several disks lie in a vertical plane which includes the diagonal portion of the longitudinal frame bar upon which the disks are carried, as is also true of the construction shown in Figures 1 and 2. In Figure 12, the disks 302, 303 and 304 are arranged to rotate on the frame bar 301 and to this end the disks are provided with bearing means best shown in Figure 14. Each bearing comprises a sleeve 400 which is fixedly held on the frame bar 301 by means of a collar 401 provided with a set screw 402. Preferably, in order to prevent the bearing from moving away from the collar 401, the bearing is provided with a lug 404 received within a suitably formed recess or notch carried by the collar 401, so that when the latter is fixed to the frame bar, the bearing 400 is securely fixed to the frame bar 301. Each of the disks is secured to a bearing sleeve 406 which is journaled over the sleeve 400 and is fixed to the disk by means of bolts 407 or the equivalent. These bolts are also utilized to fasten a plate 408 over the rear end of the bearing sleeve 406 so as to engage the rear side of a flange 409 carried by the sleeve 400 and against the forward shoulder of which the bearing sleeve 406 engages. The disk is thus rotatably mounted on the sleeve 400 which, in turn, is affixed to the frame bar 301. The collar 401 is preferably provided with an arm 410 to which a scraper arm 411 is suitably connected, as by bolts 412. The scraper arm 411 may be formed or carry any suitable means for scraping soil from the disk.

Since the lower portions of the disks 302, 303 and 304, rotatably carried upon the frame bar 301 by the bearing means just described, are in engagement with the soil and are below the diagonal portion of the frame bar on which the disks are carried, there is a tendency for the pressure of the soil to raise the disks out of the proper plowing position. Since the rear end of the frame bar 301 is journaled by the spindle section 337 in the rear supporting truck 7, the action of the soil pressure against the disks is resisted by the lifting connections including the lifting lever 370 at the front of the plow. In order that these lifting connections may also function as means for preventing the frame bar 301 with its disks from rising out of working position, suitable locking means is provided to prevent the raising lever 370 from swinging laterally about the vertical axis defined by the pin 374. This locking mechanism is best shown in Figure 13 and comprises a pair of spaced lugs 420 which are formed as a part of or carried by the bracket 372 and extend rearwardly over a rearwardly extending flange 421 fixed to the front axle 308 and provided with two perforations 422 and 423. A spring biased plunger 425 is carried by the lugs 420 and is shown in Figure 13 as in a raised position out of engagement with both of the perforations 422 and 423. A chain 427 is connected at its lower end with the upper end of the plunger 425 and at its upper end with the arm section 377, and the chain serves to hold the plunger up when the arm 377 is raised.

When the adjusting and raising lever 370 is in the position shown in Figure 13, representing the raised position of the plow, the plunger is held out of engagement with the perforations in the flange 421 by the chain 427, but when the frame bar 301 is lowered by raising the lever 370, the latter swings laterally about its pivot 374, bringing the plunger 425 opposite one of the perforations 422 and 423, and the raising of the lever 370 then lowers the arm section 377 and allows the spring to project the plunger 425 in one of the perforations whenever the bracket 372 has been swung laterally sufficiently to bring the plunger over the perforation. At this time the chain 427 will be slack so that the plunger 425 is ready to engage in either one or the other of the perforations whenever the plow has reached one of its operating positions. Whenever the plunger is engaged in either one of the perforations, the upward reaction of the soil pressure against the disks and the frame bar 301 acts through the arm 384 and the link 381 against the arm section 377, but since the lever 370 is held by the engagement of the detent mechanism in one of the notches 387 and also since the bracket 372 is not permitted to swing laterally due to the engagement of the plunger 425 in one of the perforations, the pressure of the soil on the furrow openers 302, 303, and 304 is transmitted to the front truck 306.

Where the plow shown in Figures 11 and 12 is a disk plow, it is desirable to angle the rear truck 307 so as to prevent the disks from running too far landwardly, and to this end the angle of lead of the rear wheels 312 and 313 is arranged to be adjusted by mechanism which comprises a screw 450 journaled in a collar 451 and threaded into a nut member 452. The collar 451 is pivotally mounted between the ends of a bifurcated arm 453 extending laterally from and carried by or formed integral with the socket member 335. The nut member 452 is pivotally mounted between a pair of arms 454 which are fixed to a bracket 455 extending laterally from the spindle section 337 and secured thereto in any manner desired. By turning the screw 450 in either direction, the angular relation between the rear truck 307 and the frame bar 301 may be adjusted to bring the rear wheels 312 and 313 to the desired angle of lead.

Figures 16 to 20 are in the nature of schematic diagrams demonstrating the operation of the present invention as embodied in the two forms of plows described above. As best illustrated in Figures 1 and 11, the frames 1 and 301, while formed of angularly related sections, are each so constructed and arranged that the sections all lie in one plane, a plane which is substantially horizontal when the plow is in one of its working positions. By virtue of this construction, when the frame is raised from a working position to substantially 90° to bring the furrow openers to transport position, the longitudinally disposed frame bar lies in a vertical plane, which appears as a straight line in Figure 16, with the front and rear trucks in a trailing relation and the supporting wheels thereof disposed in substantially parallel planes. When the field has been reached and it is desired to plow, the frame is swung downwardly, say to the right to the position shown in Figures 1, 11 and 17, and because of the angular relation between the rear spindle end of the disk supporting bar and the general longitudinal axis of the bar, this downward movement of the frame causes the rear truck 7 to take the position shown in Figure 17 with the rear wheels leading off to the land. As the implement is placed in operation, the tendency is, first, for both the rear wheels and the disks to lead off to land, but as this occurs the rear end of the frame swings landward, carrying with it both the front truck 6, which is shifted from the position shown in Figure 17 to the position shown in Figure 18, and the rear truck 7, until the rear wheels are angled to lead furrowward sufficiently to counteract the tendency for the disks to run landwardly. The frame is so designed that when this balance is reached, the front truck is disposed substantially transversely to the line of advance of the implement. During these shifting movements of the front axle, the front wheels 10 and 11 are steered in the direction of advance by the steering connections with the draft tongue. Figure 18 thus represents the plowing position of the implements shown in Figures 1 and 11.

After having been in a working position, it may be desired to transport the implement to another field, and when the lifting mechanism is actuated to swing the disk supporting bar to its vertical position, the front and rear trucks take the position shown in Figure 19, the upward rocking of the frame bar swinging the rear truck 7 to a position at substantially right angles to the vertical plane in which the frame bar lies, and simultaneously the front axle is swung from a position at right angles to the previous line of draft to a position not at right angles to the line of draft but at substantially right angles to the vertical plane in which the frame bar is disposed. In this position, however, the front dirigible wheels are maintained in parallelism with respect to the line of advance by virtue of the steering connections with the draft tongue as described above in connection with both of the modifications shown. Now as the machine is pulled forwardly in its transport position, the rear wheels lead off to the right so as to bring the rear truck into the trailing position shown in Figures 16 and 20. When the machine is operated to swing the frame bar to the left, the relations described above are substantially the same. Thus, in a machine embodying the above features, when the plow is reversed from one working position to the other, the rear wheels are automatically shifted to the proper position with the same angle of lead in each case.

In Figures 16 to 20, the reference numerals used in the description of the modification shown in Figures 1 and 2 have been employed, but it will be apparent that the plow shown in Figure 11 utilizes the same relations.

It is to be understood that the principles of the present invention may be embodied in implements other than plows of the disk or reversible type described above. For example, a plow may be constructed with other types of furrow openers which may or may not be arranged to be reversed. The type of supporting frame shown in Figures 1 and 11 may be employed in non-reversible plows with all of the advantages of simplicity and sturdiness, together with ease of raising and lowering the same from transport position, which are present in the reversible disk plows described above. While the type of construction shown in Figure 2, with the disks supported on downwardly disposed supporting brackets or standards, is preferred over the type of support shown in Figure 12, in which the disks are journaled directly on the supporting bar, which is thus carried much lower to the ground, it will be apparent that where the plow shown in Figures 11 and 12 is not reversible, the furrow openers may be carried on depending standards similar to those shown in Figure 2.

One of the advantages of having the disks supported on pendant brackets is that the disks may be given the usual downward and forward tilt, the position in which the disks of disk plows are usually mounted. This positioning of the disks results in a better action than when the planes of the several disks are vertical, as in the case in the plow shown in Figure 12. Journaling the disks directly on the frame bar requires that the disks be positioned in vertical planes in order that they will be in the same relative position with respect to the line of advance in either of their alternative operating positions. However, if the plow were to be used only as a one-way plow, the bearing sleeves for the disks could be so shaped or other means provided so as to give the disks the desired downward and forward tilt. Also, mounting the disks on depending brackets has the additional advantage in that greater clearance is provided under the frame bar.

From the above it will be apparent that the present invention is not to be limited to the specific details shown and described above, but that, in fact, widely different means may be employed in the practice of the broader aspects of my invention.

What I claim, therefore, and desire to secure by Letters Patent is:

1. A plow comprising a generally longitudinally disposed supporting bar having a first spindle portion at its forward end and a second spindle portion at its rear end arranged at an angle to said first spindle portion, a furrow opener carried by said bar, supporting means including a longitudinally disposed bearing in which the front spindle is journaled for rotation, rear supporting means including a bearing in which the rear spindle portion of said bar is journaled, and means for rocking said supporting bar in said bearings to raise and lower said furrow opener, the angularity of the spindle portions automatically changing the position of said front and rear supporting means with respect to one another as the bar is rocked.

2. A reversible plow comprising a generally longitudinally disposed main supporting bar having a spindle at each end, one arranged at an angle with respect to the other, furrow opening means carried by said bar, front supporting means for said bar including a bearing in which the front spindle portion of the bar is journaled for rotation about a generally longitudinal axis, rear supporting means for said bar including a bearing in which the rear spindle of said bar is journaled for movement about a generally longitudinal axis, and means providing for the rotation of said main supporting bar in its bearings to dispose said furrow opening means in either of its alternative operating positions, the angularity between the spindles serving to dispose said front and rear supporting means in the proper position in each alternative position of said furrow opening means.

3. A disk plow comprising a disk supporting bar having a spindle at each end, a disk carried by said bar, a bearing in which the front spindle is journaled for rotation about a generally longitudinal axis, supporting means carrying said bearing, a two wheel supported frame having a bearing in which the rear spindle portion of said bar is journaled, and means for rotating said supporting bar in said bearings to raise said disk from a working position to a non-working position.

4. A disk plow comprising a generally longitudinally disposed supporting member mounted for rocking movement about a generally longitudinally disposed axis, a disk carried by said member, a wheeled supporting truck for said frame and arranged with the wheels thereof disposed at a given horizontal angular relation with respect to said member, means for rocking said member to raise and lower said disk, and means cooperating with said member and said truck for changing the angular relation of the latter simultaneously with the raising and lowering of said disk.

5. A disk plow comprising a generally longitudinally disposed disk supporting bar having a spindle at its rear end arranged at an angle with respect to the general axis of said bar, supporting means for the front end of said bar and arranged to accommodate rocking movement of the latter, a furrow opening disk carried by said bar, a rear truck including a bearing receiving the rear spindle of said disk supporting bar, whereby the latter is capable of rocking movement about a generally longitudinal axis, and means for rocking said disk supporting bar to raise said disk from a working position to a non-working position, the angle between said rear spindle and the bar being such that the rear truck is positioned with the proper lead when the disk is in its working position and in a generally straight ahead position when the disk is raised.

6. A reversible disk plow comprising a disk supporting bar having a spindle at each end, a disk carried by said bar, supporting means including a bearing in which the front spindle portion is journaled for rotation about a generally longitudinal axis, a two wheel supported frame having a bearing in which the rear spindle of said bar is journaled, and means for rotating said supporting bar in said bearings to dispose said disk in either of its alternative operating positions, the axis of said last bearing being disposed to make equal angles with the axes of said wheels and the axis of said rear spindle being disposed at an angle with respect to the line of advance to position at least one of said wheels at an angle to the line of advance.

7. A reversible disk plow comprising a disk supporting bar having a spindle at each end, a disk carried by said bar, supporting means including a bearing in which the front spindle portion is journaled for rotation about a generally longitudinal axis, a two wheel supported frame having a bearing in which the rear spindle of said bar is journaled, means for rotating said supporting bar in said bearings to dispose said disk in either of its alternative operating positions, the axis of said last bearing being disposed to make equal angles with the axes of said wheels and the axis of said rear spindle being disposed at an angle with respect to the line of advance to position at least one of said wheels at an angle to the line of advance, and means for adjusting the angular position of said rear spindle to change the angle of said last wheel.

8. A plow comprising a longitudinally disposed main supporting bar having means serving as a spindle at each end thereof, front and rear trucks supporting said bar and each having bearing means receiving the spindle ends of the bar and providing for rocking movement of the latter about a generally longitudinal axis, furrow opening means carried by said bar and held against angular displacement with respect thereto, the rear spindle section of said bar and its bearing in the rear truck being so disposed relative to the rear truck so that the latter is positioned at a predetermined angle with respect to the general longitudinal axis of the main supporting bar, and means cooperating with the rear spindle section and the rear truck for adjusting the angularity between the main supporting bar and the rear truck.

9. A plow comprising a generally longitudinally disposed main supporting bar having means serving as a spindle at each end thereof, furrow opening means carried by said bar, means serving as front and rear supporting trucks for the front and rear ends of said bar and each of said truck means having a generally longitudinally disposed bearing section receiving said spindle means, the rear spindle section being disposed angularly with respect to the main body of the supporting bar and the rear bearing means receiving said spindle section including an eccentric sleeve interposed between the angularly disposed rear spindle section and the rear supporting truck means, whereby the latter has an angle of lead with respect to the axis of the supporting bar when the furrow opening means is disposed in working position, and means for holding said eccentric sleeve in any one of a plurality of positions for maintaining a given angularity between the rear truck means and the main supporting bar.

10. A reversible disk plow comprising a disk supporting bar having a spindle at each end, a disk carried by said bar, supporting means including a bearing in which the front spindle portion is journaled for rotation about a generally longitudinal axis, a two wheel supported frame having a bearing in which the rear spindle of said bar is journaled, means for rotating said supporting bar in said bearings to dispose said disk in either of its alternative operating positions, the axis of said last bearing being disposed to make equal angles with the axes of said wheels and the axis of said rear spindle being disposed at an angle with respect to the line of advance to position at least one of said wheels at an angle to the line of advance, said rear spindle comprising a sleeve journaled in the bearing of said wheel supported frame and having a longitudinally disposed eccentric boring and a rearwardly extending shank disposed in said boring and fixed to the rear end of said supporting bar, whereby the angular position of the axis of said sleeve with respect to the supporting bar may be adjusted to change the angle of said last wheel, and means for locking the sleeve to the shank in any one of a plurality of positions.

11. A plow comprising a main generally longitudinally disposed supporting bar having a spindle portion at each end thereof, supporting means for the forward end of said bar and including a bearing in which the front spindle portion is journaled for rotation about a generally longitudinal axis, rear supporting means for said bar including a bearing in which the rear spindle portion of said bar is journaled, a sleeve journaled over the intermediate portion of said main supporting bar, a furrow opener carried by said sleeve in eccentric relation with respect to the axis of the latter, means for rotating said bar in said bearings to raise and lower said furrow opener, and means for holding the sleeve so as to prevent the pressure on said furrow opener from rotating said sleeve when the furrow opener is in working position.

12. A disk plow comprising a disk supporting bar having a spindle portion at each end and an intermediate diagonally disposed offset portion, supporting means including a bearing in which the front spindle portion is journaled for rotation about a generally longitudinal axis, a two wheel supported frame having a bearing in which the rear spindle portion of said bar is journaled, a sleeve journaled over said offset portion, a disk standard depending from said sleeve, a disk journaled on the lower end of said standard, means for rotating said bar in said bearings to alternatively position said disk in a working or a raised non-working position, and means active when the disk is in working position for holding the sleeve so as to prevent the pressure on said disk during operation rotating said sleeve on said offset portion out of working position.

13. A disk plow comprising a disk supporting bar having a spindle portion at each end and an intermediate diagonally disposed offset portion, front supporting means for the bar including a bearing in which the front spindle portion of said bar is journaled for rotation about a generally longitudinal axis, supporting means for the rear end of said bar including a bearing in which the rear spindle portion of said bar is journaled, a sleeve journaled over said offset portion, a disk standard depending from said sleeve, a disk journaled on the lower end of said standard, means for rotating said bar in said bearings to alternatively position said disk in a working or a raised non-working position, and means for imposing the reaction of the pressure transmitted to the sleeve through the disk on at least one of said supporting means.

14. A disk plow comprising a disk supporting bar having a spindle portion at each end and an intermediate diagonally disposed offset portion, supporting means including a bearing in which the front spindle portion is journaled for rotation about a generally longitudinal axis, a two wheel supported frame having a bearing in which the rear spindle portion of said bar is journaled, a sleeve journaled over said offset portion, a disk standard depending from said sleeve, a disk journaled on the lower end of said standard, means for rotating said bar in said bearings to alternatively position said disk in a working or a raised non-working position, and an inner connection between said sleeve and said frame for holding said sleeve against rotation about its own axis.

15. A reversible disk plow comprisig a disk supporting bar having a spindle portion at each end and an intermediate diagonally disposed offset portion, supporting means including a bearing in which the front spindle portion is journaled for rotation about a generally longitudinal axis, a two wheel supported frame having a bearing in which the rear spindle portion of said bar is journaled, a sleeve journaled over said offset portion, a standard carried by said sleeve, a disk journaled on the lower end of said standard for rotation about an axis intersecting the axis of said sleeve, means for rotating said bar in said bearings to alternatively dispose said offset portion on either side, to dispose said disk in either of its two working positions, or in a substantially vertical position to dispose said disk in a transport position, and means for holding said sleeve for the purpose of preventing the pressure on said disk during operation rotating said sleeve on said offset portion out of working position.

16. A disk plow comprising a disk supporting bar having a spindle portion at each end and an intermediate diagonally disposed offset portion, supporting means including a bearing in which the front spindle portion is journaled for rotation about a generally longitudinal axis, a two wheel supported frame having a bearing in which th rear spindle portion of said bar is journaled, a sleeve journaled over said offset portion, a disk standard depending from said sleeve, a disk journaled on the lower end of said standard, means for rotating said bar in said bearings to alternatively position said disk in a working or a raised non-working position, means for preventing rotaton of said bar beyond a position representing the working position of said disk, and means for holding said sleeve so as to prevent the pressure on said disk during operation from rotating said sleeve on said offset portion out of working position.

17. A disk plow comprising front and rear supporting trucks, the front truck including a frame, a draw bar pivotally connected therewith, and dirigible wheels supporting the truck and connected with the draw bar to be steered thereby, a substantially longitudinal bearing carried by each of said supporting trucks, a disk supporting bar comprising a generally longitudinal portion at each end and an intermediate offset portion, said longitudinal portions being journaled in said bearings, respectively, a disk carried by said offset portion, and means on one of said trucks for rotating said bar to alternatively dispose said offset portion in a lateral position or a substantially vertical position to dispose said disk either in a working position or in a non-working position.

18. A reversible disk plow comprising two longitudinally spaced wheel supported frames, a bearing on each frame, a disk supporting bar having a spindle portion on each end and an intermediate diagonally disposed offset portion, said spindles being journaled in said bearings, respectively, a sleeve journaled over said offset portion, a disk standard fixed to said sleeve, a disk journaled on the lower end of said standard for rotation about an axis intersecting the axis of sleeve, means for rotating said bar in said bearings to alternatively dispose said offset portion on either side or in a substantially vertical position to dispose said disk in either of its two working positions or in a transport position, and means for holding said sleeve against rotation about its own axis relative to one of said frames during the rotation of said bar.

19. A reversible disk plow comprising two longitudinally spaced wheel supported frames, a bearing on each frame, a disk supporting bar having a spindle portion on each end and an intermediate diagonally disposed offset portion, said spindles being journaled in said bearings, respectively, a sleeve journaled over said offset portion, a disk standard fixed to said sleeve, a disk journaled on the lower end of said standard for rotation about an axis intersecting the axis of said sleeve, means for rotating said bar in said bearings to alternatively dispose said offset portion on either side or in a substantially vertical position to dispose said disk in either of its two working positions or in a transport position, and means comprising a jointed connection between said sleeve and one of said frames for holding said sleeve against rotation about its own axis relative to one of said frames during the rotation of said bar.

20. A reversible disk plow comprising two longitudinally spaced wheel supported frames, a bearing on each frame, a disk supporting bar having a spindle portion on each end and an intermediate diagonally disposed offset portion, said spindles being journaled in said bearings, respectively, a sleeve journaled over said offset portion, a disk standard fixed to said sleeve, a disk journaled on the lower end of said standard for rotation about an axis intersecting the axis of said sleeve, means for rotating said bar in said bearings to alternatively dispose said offset portion on either side or in a substantially vertical position to dispose said disk in either of its two working positions or in a transport position, means for holding said sleeve against rotation about its own axis relative to one of said frames during the rotation of said bar, means for locking said bar to one of said frames in either working position, and means for holding said sleeve to prevent the pressure on said disk during operation rotating said sleeve and said one frame as a unit relative to said bar.

21. A plow comprising a generally longitudinally disposed supporting bar having a spindle portion at its forward and rear ends, a furrow opener carried by said bar, supporting means including means for transmitting draft thereto and a longitudinally disposed bearing in which the front spindle is journaled for rotation, rear supporting means including a bearing in which the rear spindle portion of said bar is journaled, and means for rocking said supporting bar in said bearings to raise and lower said furrow opener.

22. A reversible plow comprising a generally longitudinally disposed main supporting bar having a spindle at each end, furrow opening means carried by said bar, front supporting means for said bar including means for transmitting draft thereto and a bearing in which the front spindle portion of the bar is journaled for rotation about a generally longitudinal axis, rear supporting means for said bar including a bearing in which the rear spindle of said bar is journaled for movement about a generally longitudinal axis, and means providing for the rotation of said main supporting bar in its bearings to dispose said furrow opening means in either of its alternative operating positions.

CARL G. STRANDLUND.